US012658361B2

(12) United States Patent
Xu et al.

(10) Patent No.: US 12,658,361 B2
(45) Date of Patent: Jun. 16, 2026

(54) COATING MATERIALS FOR DIFFUSING INTO MAGNET OF NdFeB AND A METHOD OF MAKING IT

(71) Applicant: Ningbo Jinji Strong Magnetic Material Co., Ltd., Ningbo City (CN)

(72) Inventors: Feng Xu, Ningbo City (CN); Long Meng, Ningbo City (CN); Shimao Shen, Ningbo City (CN); Yuanhu Hu, Ningbo City (CN)

(73) Assignee: Ningbo Jinji Strong Magnetic Material Co., Ltd., Ningbo City (CN)

( * ) Notice: Subject to any disclaimer, the term of this patent is extended or adjusted under 35 U.S.C. 154(b) by 258 days.

(21) Appl. No.: 18/499,855

(22) Filed: Nov. 1, 2023

(65) Prior Publication Data

US 2024/0062954 A1 Feb. 22, 2024

Related U.S. Application Data

(62) Division of application No. 16/837,822, filed on Apr. 1, 2020, now Pat. No. 11,848,152.

(30) Foreign Application Priority Data

Mar. 17, 2020 (CN) ......................... 202010185809.1

(51) Int. Cl.

| | |
|---|---|
| ***H01F 41/02*** | (2006.01) |
| ***B22F 1/107*** | (2022.01) |
| ***B22F 3/10*** | (2006.01) |
| ***B22F 7/00*** | (2006.01) |
| ***C22C 38/00*** | (2006.01) |
| ***C22C 38/10*** | (2006.01) |
| ***H01F 1/053*** | (2006.01) |

(52) U.S. Cl.
CPC .......... *H01F 41/0293* (2013.01); *B22F 1/107* (2022.01); *B22F 3/1017* (2013.01); *B22F 7/008* (2013.01); *C22C 38/005* (2013.01); *H01F 1/053* (2013.01); *B22F 2998/10* (2013.01); *C22C 38/10* (2013.01); *C22C 2202/02* (2013.01); *H01F 41/0246* (2013.01)

(58) Field of Classification Search
CPC .................. H01F 41/0293; H01F 1/057–0579
See application file for complete search history.

(56) References Cited

U.S. PATENT DOCUMENTS

| | | | | |
|---|---|---|---|---|
| 2013/0068992 | A1* | 3/2013 | Hono | C22C 38/005 252/62.55 |
| 2017/0278609 | A1* | 9/2017 | Hagiwara | H01F 7/021 |
| 2018/0061540 | A1* | 3/2018 | Wang | H01F 41/026 |

FOREIGN PATENT DOCUMENTS

| | | | | | |
|---|---|---|---|---|---|
| CN | 107026003 | A | * | 8/2017 | H01F 41/0293 |
| CN | 109695015 | A | * | 4/2019 | C23C 10/18 |
| JP | 2011211071 | A | * | 10/2011 | H01F 41/0293 |
| JP | 2016082176 | A | * | 5/2016 | |
| KR | 20180068272 | A | * | 6/2018 | H01F 41/0293 |
| KR | 102044415 | B1 | * | 11/2019 | H01F 41/0293 |
| WO | WO-2011108704 | A1 | * | 9/2011 | H01F 1/0577 |

* cited by examiner

*Primary Examiner* — Sally A Merkling
*Assistant Examiner* — Austin Pollock
(74) *Attorney, Agent, or Firm* — INNOVATION CAPITAL LAW GROUP, LLP; Vic Lin

(57) ABSTRACT

The application discloses a coating material for fabricating rare earth magnets and a method using the coating material to prepare neodymium-iron-boron (NdFeB) magnets having high coercive force. The coating material includes alloy powder A and low-melting-point metal powder B. The alloy powder A is heavy rare earth element R powder, or rare earth-metal alloy (RM) powder, or rare earth-metal-hydrogen alloy (RMH) powder. The heavy rare earth elements are Dy and/or Tb, metal is Fe or Co, or an alloy of Fe and Co, and H is hydrogen element. The low-melting-point metal powder B is one or two of Zn, Al, and Ga. The preparation method includes the following steps: the coating material is mixed into a slurry, and the slurry is coated on the surface of NdFeB magnet, and then apply a two-stage diffusion heat treatment to the magnet, followed by an annealing process to obtain a high-coercivity NdFeB magnet.

7 Claims, No Drawings

COATING MATERIALS FOR DIFFUSING INTO MAGNET OF NdFeB AND A METHOD OF MAKING IT

CROSS-REFERENCES TO RELATED APPLICATIONS

This application is a divisional of U.S. application Ser. No. 16/837,822 filed on Apr. 1, 2020, which claims priority to Chinese patent application No. 202010185809.1 filed on Mar. 17, 2020, both entitled "COATING MATERIALS FOR DIFFUSING INTO MAGNET OF NdFeB AND A METHOD OF MAKING IT", the disclosure of which is incorporated herein by reference in entirety.

TECHNICAL FIELD

The application relates to the field of rare earth permanent magnet materials, and in particular, relates to a coating material for a permeable magnet and a method for preparing for it.

BACKGROUND

Since the invention of sintered neodymium iron boron magnets in 1983, it has been widely used in internet technology, medical equipment, home appliances, new energy vehicles and other fields because of its excellent magnetic properties, thus this material has been known as the "magnet king". With the development of the market, not only sintered neodymium iron boron magnets are required to have high magnetic properties, but also demands high temperature resistance characteristics, so the magnets need to have higher coercive force. Therefore, improving the coercive force of the magnet while ensuring the magnet's magnetism property has become a hot spot for technological research and development. At present, most companies increased their coercive force by adding heavy rare earth elements such as Dysprosium (Dy) or Terbium (Tb) during smelting, so that the light rare earth elements, mainly neodymium (Nd) and praseodymium (Pr) in the grain are replaced by heavy rare earth elements. By increasing the grain anisotropy field, their coercivity is improved. However, this method has the following problems: First, Dy or Tb enters the main grains to form $Dy (Tb)_2 Fe_{14}B$ layer with a low saturation magnetization, which leads to a significant reduction in magnet magnetism. In addition, Dy (Tb) mostly enters the main phase and only a small amount distributed at the grain boundaries, which causes low utilization of Dy (Tb), and adding a large amount of Dy (Tb) to overcome it will undoubtedly increase product costs.

The grain boundary diffusion method refers to a method of providing Tb, Dy, or other compound thereof around a neodymium-iron-boron sintered magnet, applying a high temperature to melt the grain boundary phase, and causing Tb or Dy to diffuse from the surface to the inside of the sintered magnet. This technology improves the coercive force by magnetically hardening the grain by entering Dy (Tb) diffusion heat treatment from the magnet surface into the magnet grain and grain external layers. Because Dy (Tb) does not enter the main crystal phase, the product's magnetic properties do not decrease, and the "magnetic hardening" of the main phase boundary greatly increases the coercive force of the magnet.

Regarding the method for improving the coercive force of magnets using the grain boundary diffusion method, Hitachi patent (CN 107004500 A and U.S. Pat. No. 10,410,776) disclosed that take RLM alloy powder (RL is Nd and/or Pr, and M is one of Cu, Fe, Ga, Co, Ni, Al or more combined) and coat the powder on the surface of the magnet, and then apply a sheet-shaped molded material formed of the Tb or Dy oxide and resin component on the RLM particle layer, and finally place the magnet in a sintering furnace for high temperature and aging treatment to make Tb or Dy diffuse into the grain to enter the sintered magnet. Shin-Etsu patent (CN 102468027A and U.S. Pat. No. 8,388,766) disclosed that placing a metal, compound or intermetallic compound containing HR (HR is selected from at least one element from Dy, Tb and Ho), in powder or film form, on the surface of the sintered body to cover the sintered body, then subject the sintered body to a high temperature heat treatment, and as a result Dy, Tb or Ho enters the crystal grain boundary phase of the magnet. These methods essentially make Dy or Tb diffuse through the grain boundaries into the main phase of the sintered magnet through high-temperature sintering, thus improve the structure and composition of the interfaces of the grain boundaries and the main phase.

However, the current grain boundary diffusion method also has problems: 1. The utilization rate of the diffusion material is relatively low, yet heavy rare earth elements are expensive and there is a lot of waste; 2. The consistency and uniformity of the diffusion process are relatively poor.

BRIEF SUMMARY OF THE DISCLOSURE

The present invention addresses the above-mentioned shortcomings in the related art, and provides a surface coating material of neodymium-iron-boron (NdFeB) for diffusing into NdFeB magnet and also provides a method for preparing such NdFeB magnet. The diffusion of the coating material along the grain boundaries in the magnet can effectively improve the coercive force of NdFeB magnets and also maintain the magnet's remnant magnetism and the maximum magnetic energy capacity.

A first aspect of the embodiment according to the present invention is to provide a magnetic coating material for diffusion into magnets, the coating material comprising:

- an alloy powder A and a low-melting-point metal powder B; wherein the alloy powder A is R powder or RM alloy powder or RMH alloy powder; wherein R is Dy and/or Tb heavy rare earth element, M is metal iron (Fe), or cobalt (Co), or an alloy composed of Fe and Co, and H is an hydrogen element;
- and the low-melting-point metal powder B is one or more of zinc (Zn), aluminum (Al), and gallium (Ga).

Preferably, the content of the low-melting-point metal powder B in the coating material is 3-10 wt %.

Preferably, the average particle size of the alloy powder A is 1-5 μm, and the average particle size of the low-melting metal powder B is 0.1-0.5 μm.

Preferably, in the RM alloy powder or RMH alloy powder, the proportion of M is ≤10% by weight.

Preferably, the M is an alloy composed of Fe and Co, and the mass ratio of the Fe and Co elements is (1-2):1.

Preferably, the alloy powder A is RMH alloy powder.

Preferably, the method for preparing the RMH alloy powder includes the following steps:

The RM alloy ingot or slab is obtained by melting, and the RMH alloy is obtained after dehydrogenation after hydrogen crushing. The RMH alloy powder is crushed to obtain RMH alloy powder. The average particle size of the powder is 1-2 μm.

Another aspect according to the embodiment of the present invention is to provide a method for preparing a high coercive force NdFeB magnet, including the following steps:

The coating material of the first aspect of the present invention is made into a slurry, and the slurry is coated on the surface of a neodymium-iron-boron substrate, followed by two-stage diffusion heat treatment, and then annealing is performed to obtain a high-coercivity neodymium-iron-boron magnet.

Preferably, the slurry is composed of the following ingredients: coating material formed by the alloy powders of A and B, 50-70 wt %, 0-8 wt % of thermoplastic resin, and the organic solvent makes the balance.

Preferably, the two-stage diffusion heat treatment is: in stage one, diffusion at 600-800° C. for 5 to 15 hours, and in stage two, diffusion at 850-1000° C. for 10-20 h.

Preferably, the annealing temperature treatment is performed in a range of 350-550° C. for 4 to 6 hours.

DETAILED DESCRIPTION OF THE DISCLOSURE

The technical solution of the present disclosure will be clearly and completely described below with reference to the drawings. Obviously, the described embodiments are part of the embodiments of the present disclosure, instead of all of them. Based on the embodiments in the present disclosure, all other embodiments obtained by one skilled in the art without contributing any inventive labor shall fall into the protection scope of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. The following brief definition of terms shall apply throughout the application:

The term “comprising” means including but not limited to, and should be interpreted in the manner it is typically used in the patent context. The phrases “in one embodiment,” “according to one embodiment,” and the like generally mean that the particular feature, structure, or characteristic following the phrase may be included in at least one embodiment of the present invention, and may be included in more than one embodiment of the present invention (importantly, such phrases do not necessarily refer to the same embodiment). If the specification describes something as “exemplary” or an “example,” it should be understood that refers to a non-exclusive example; The terms “about” or “approximately” or the like, when used with a number, may mean that specific number, or alternatively, a range in proximity to the specific number, as understood by persons of skill in the art field.

If the specification states a component or feature “may,” “can,” “could,” “should,” “would,” “preferably,” “possibly,” “typically,” “optionally,” “for example,” “often,” or “might” (or other such language) be included or have a characteristic, that particular component or feature is not required to be included or to have the characteristic. Such component or feature may be optionally included in some embodiments, or it may be excluded.

Compared with the current techniques, the beneficial effects of the disclosed technique are:

1) With the present technique, a metal powder B with low melting point and an alloy powder A which contains heavy rare earth elements, Dysprosium (Dy) and/or Terbium (Tb), form as coating materials, and a two-stage diffusion heat treatment of magnet is performed at 600-800° C. for 5 to 15 hours first, and then at 850-1000° C. for 10-20 hours to provides a full diffusion. On the one hand, the added metal powder B with low melting point first enters the magnet grain boundaries during the heat treatment process, it opens the grain boundary channels first, and these channels improve the diffusion efficiency, diffusion depth, and diffusion uniformity of the heavy rare earth elements alloy A, and in addition this diffusion improves the coercive property of the magnet to be diffused into. From another perspective, the addition of the low melting point metal powder B reduces the relative content of the heavy rare earth elements in the coating materials and thereby effectively reduces the cost of the coating. Therefore, the disclosed technique achieves a high coercive magnet, and meanwhile reduces the cost of fabrication.
2) The alloy powder A of the present invention contains three parts: RMH. Here M is an alloy composed of iron (Fe) and cobalt (Co), and the mass ratio of the Fe and Co elements is (1-2):1. The combined use of Fe and Co is more helpful to the efficiency and uniformity of heavy rare-earth elements diffusing into the grain. In addition, as the Fe and Co elements diffuse through the grain boundaries of the magnet, they also repair or modify grain boundary defects and refine the grains. The magnet coercivity is therefore improved while maintaining the magnet’s magnetic remanence and the maximum magnetic energy capacity.
3) The present invention uses a thermoplastic resin to form a slurry with the coating material. The thermoplastic resin has a good adhering effect, capable of improving the adhesion between the coating material and the magnet, and thus effectively preventing the coating material from falling.

The neodymium-iron-boron magnet obtained by the technical method in this invention has the characteristics of uniformity, good consistency, and good diffusion depth of the heavy rare-earth elements, and can maintain the magnet’s remanence and maximum magnetic energy capacity while achieving high coercive force.

EMBODIMENTS

Hereinafter, embodiments will be described in detail with respect to the coating material and the method for preparing a high-coercive force NdFeB magnet. However, these embodiments are exemplary, and the present disclosure is not limited thereto.

According to some embodiments of the present invention, the coating material for diffusing into the neodymium iron boron magnet includes:

Alloy powder A and metal powder B of low melting point;

The alloy powder A is R powder or RM alloy powder or RMH alloy powder; wherein R is Dy and/or Tb heavy rare earth element, M is metal Fe and/or Co element, and H is hydrogen element.

The low-melting-point metal powder B is one or more of Zn, Al, and Ga.

Some embodiments of the present invention includes adding low melting point metal powder as a part of the diffusion material, which improves the diffusion ability of the heavy rare earth elements like Dy and/or Tb in the grain of the magnet matrix. Having the low-cost low-melting point metal powder made into the coating material partially replaces the heavy rare earth element Dy and/or Tb, and effectively reduces the process costs.

The alloy powder A and the low-melting point metal powder B are physically mixed. The method of physical mixing is not limited. Certain powder mixing equipment, such as a V-type mixer, can be used.

In some embodiments of the present invention, after the alloy powder A and the low-melting metal powder B are mixed, the content of the low-melting point metal powder B is 3-10% by weight. The content ratio of the low melting point metal powder B in the coating material has a great effect on the diffusion of Dy and/or Tb at the grain boundaries. If the content of the low melting point metal powder B is too high, the coercivity of the magnet will be reduced, and if the content of the low melting point metal powder B is too low, the diffusion of Dy and/or Tb through the grain boundaries cannot be enough.

In other embodiments of the present invention, the content of the low-melting metal powder B is 6-8 wt %, and the low-melting point metal powder B performs better within this content range.

In some embodiments of the present invention, the average particle size of the alloy powder A is 1-5 and the average particle size of the low melting point metal powder B is 0.1-0.5 Refining and homogenizing the particle sizes of the powders helps the diffusing element more uniform and more efficient. Thus, the diffusion element can better surround the magnetic main phase and increase the density of the magnet. The average particle size of the low melting point metal powder B is preferably smaller than that of the alloy powder A. The particle sizes of powders are related to their melting point. The smaller the particle size, the lower the melting point will be. Therefore, having smaller average particle size for the lower melting point metal powder B enables the sequential diffusion of low melting point metal powder B and alloy powder A along the grain boundaries of the magnet.

In some embodiments of the present invention, in the RM alloy powder or RMH alloy powder, the proportion of metal M is ≤10% by weight. The melting point of the alloy formed by the R element (rare earth) and the M element(metal) is lower than the melting point of the elemental R component. The diffusion of R element into the magnet in the form of the RM alloy can reduce the subsequent heat treatment temperature and reduce energy loss. The RM alloy form reduces the melting point of the liquid phase and provides more grain boundary channels for diffusion. As a result, diffusion is easier and more rare earth elements R diffuse into the magnet. The proportion of metal is controlled within 10% by weight. Too much metal M will affect the diffusion efficiency of the rare earth element (R). More preferably, the proportion of M is 3-8% by weight.

The RM alloy powder can be prepared by methods such as molten salt electrolytic method, reduction method, etc. Examples of molten salt electrolytic method are: oxide of rare earth R in fluoride melt (such as $Dy_2F_3$, LiF, $TbF_3$, NaF, LiF, BaF2, etc.). The elementary rare earth R is electrolyzed and then alloyed with the metal M element, and formed eventually by casting and crushing. The average particle size of the RM alloy powder is 1-5 μm.

The method for preparing RMH alloy powder preferably includes the following steps: smelting raw materials to obtain RM alloy ingots or slabs, and form RMH alloy through hydrogen crushing without dehydrogenation treatment; pulverizing RMH alloy after hydrogen crushing to obtain RMH alloy powder. The average powder particle size is 1-2 μm.

The hydrogen crushing process includes placing an RM alloy ingot or slab in a hydrogen-crushing furnace, passing in hydrogen through, and set the hydrogen pressure in the furnace within the range of 0.01-1 MPa, and the crushing process takes a period of time to obtain the RMH alloy. The content of the hydrogen element in the alloy powder is related to the hydrogen absorption time, which can be controlled according to actual needs.

The pulverization after hydrogen crushing may be a pulverization process currently used, such as air/gas jet pulverization. The air/gas jet pulverization is preferably performed in a nitrogen or argon inert environment with an oxygen content of 20 ppm or less. The air/gas pulverization yields a powder having an average particle size of 1-2 μm.

As said above, in some preferred embodiments of the present invention, M is an alloy composed of Fe and Co, and the mass ratio of the Fe and Co elements is (1-2):1. The combined use of Fe and Co is more conducive to the efficiency and uniformity of heavy rare earth elements diffusion the grain boundaries. This diffusion through the grain boundaries of the magnet repairs grain boundary defects and refines the grain size.

In some preferred embodiments of the present invention, the alloy powder A is a rare earth—metal—hydrogen or RMH alloy powder. This preference is from the fact that the rare earth (R) powder or rare earth metal (RM) powder is susceptible to oxidation during the preparation process. The presence of hydrogen in the RMH alloy powder can effectively block it from reacting with oxygen and is therefore oxidized. So RMH alloy powder improves the magnetic performance to a certain extent. The content of H element is not specifically defined or limited, it can be introduced according to actual needs, and the content of H element can be adjusted by controlling the hydrogen absorption process in the furnace.

In some embodiments of the present invention, a method for preparing a NdFeB magnet with high coercive force includes the following steps:

The coating material is made into a slurry, and the slurry is coated on the surface of the neodymium-iron-boron substrate. Then perform a two-stage thermal diffusion treatment to diffuse the coating material into the neodymium-iron-boron substrate. An annealing process follows the diffusion treatment. At the end, a high-coercivity neodymium-iron-boron magnet is obtained.

The coating material includes: alloy powder A and low melting point metal powder B.

The alloy powder A is a heavy rare earth (R) powder or rare earth metal (RM) alloy powder or rare earth metal hydrogen (RMH) alloy powder; wherein R is Dy and/or Tb heavy rare earth element, M is Fe, or Co, or an alloy composed of Fe and Co, and H is hydrogen element.

The low-melting-point metal powder B is one or two of Zn, Al, and Ga.

In some embodiments of the present invention, the slurry includes the following ingredients in their weight percentages: coating material at 50-70 wt %, thermoplastic resin at 0-8 wt %, the rest is the organic solvent.

Examples of the thermoplastic resin include polyvinyl butyral, polyvinyl acetal, and polyvinyl alcohol. The organic solvents are alcohols (such as methanol and ethanol) and ketones (such as acetone).

The coating material can be directly added to the organic solvent to form a slurry, or it can be added to the organic solvent together with the thermoplastic resin to form a slurry. The slurry formed by the coating material in the presence of the thermoplastic resin has better coating coverage and diffusion uniformity. Therefore, a slurry including thermoplastic resin is preferred, and the content of the thermoplastic resin in the slurry is preferably chosen at 2-5 wt %.

The slurry is coated on the surface of the neodymium-iron-boron substrate. There are many techniques of coating, including spraying, dipping or immersion, coating using a dispenser, and the like. The present invention uses preferably immersion, that is, immersing a neodymium-iron-boron substrate in the slurry. In the present invention, the amount of the coating is not particularly limited, and can be adjusted according to the requirements of the actual product so as to meet uniform and full coating coverage. In the present invention, the coating slurry is preferably 0.7-2.0 wt % of the neodymium-iron-boron substrate.

In some examples, after the slurry is coated on the surface of the neodymium-iron-boron substrate, subject the system with a two-stage diffusion heat treatment. The first stage diffusion heat treatment is performed at 600-800° C. for 5-15 hours. The second stage diffusion heat treatment is carried out at 850-1000° C. for 10-20 hours.

At the temperature of 600-800° C., the low-melting point metal powder in the coating material first melts and enters into the grain which has a guiding effect on the diffusion of the heavy rare-earth elements in the slurry, which improves grain-boundary diffusion by providing more channels for the heavy rare-earth elements to penetrate. Then during heat treatment at 850-1000° C., RMH rapidly diffuses through the low melting point channels at the grain boundaries, improving the diffusion efficiency, increasing the diffusion depth and uniformity, and at the same time completely dehydrogenating the magnet.

The first stage diffusion heat treatment time and the second stage diffusion heat treatment time should not be too short and too long. If the heat treatment time is too short, the elements have not completely diffused into the magnet, and if the time is too long, the grains are overgrown, it will not be conducive to the magnetic properties of the magnet.

After the two-stage diffusion heat treatment, a low temperature annealing treatment is performed, at 350-550° C. for 4-6 hours.

The two-stage diffusion heat treatment and annealing treatment are both performed in an inert atmosphere or in a vacuum environment. The inert gas is preferably helium or argon.

The technical solutions of the present invention are further described below through specific embodiments. The scope of the present invention is not limited by the following embodiments. Unless otherwise specified, the raw materials and methods mentioned in the examples of the present invention are current materials and methods.

Coating Material Example 1

The coating material in this embodiment is made by mixing 94 wt % Dy—Fe alloy powder and 6 wt % Al powder. The average particle size of the Dy—Fe alloy powder is 2 μm, and the average particle size of the Al powder is 0.3 μm.

In the Dy—Fe alloy powder, the Fe content is 8 wt %.

Coating Material Example 2

The coating material in this embodiment is made by mixing 94 wt % Dy—Fe—H alloy powder and 6 wt % Al powder. The average particle size of the Dy—Fe—H alloy powder was 2 μm, and the average particle size of the Al powder was 0.3 μm.

In the Dy—Fe—H alloy powder, the Fe content is 8 wt % and the H element content is 0.8%.

Coating Material Example 3

The coating material in this embodiment is made of 94 wt % Dy—Fe—Co—H alloy powder and 6 wt % Al powder. The average particle size of the Dy—Fe—Co—H alloy powder was 2 μm, and the average particle size of the Al powder was 0.3 μm.

In the Dy—Fe—Co—H alloy powder, the Fe content is 4 wt %, the Co content is 4 wt %, and the H element content is 0.8%.

Coating Material Example 4

The coating material of Example 4 differs from Example 3 only in that the Dy—Fe—Co—H alloy powder of Example 4 has an Fe content of 2 wt %, a Co content of 6 wt %, and an H element content of 0.8%. The other parts are the same as those of the third embodiment.

Coating Material Example 5

The coating material of Example 5 is different from that of Example 3 only in that the coating material of Example 5 is made of a mixture of 96 wt % Dy—Fe—Co—H alloy powder and 4 wt % Al powder. The other parts are the same as those of the third embodiment.

Coating Material Example 6

The coating material of Example 6 is different from that of Example 3 only in that the coating material of Example 6 is composed of 98 wt % Dy—Fe—Co—H alloy powder and 2 wt % Al powder. The other parts are the same as those of the third embodiment.

Coating Material Example 7

The coating material of Example 7 is different from that of Example 3 only in that the coating material of Example 7 is composed of 88 wt % Dy—Fe—Co—H alloy powder and 12 wt % Al powder. The other parts are the same as those of the third embodiment.

Coating Material Example 8

The coating material of Example 8 differs from Example 3 only in that the Dy—Fe—Co—H alloy powder of Example 8 has an Fe content of 6 wt %, a Co content of 6 wt %, and an H element content of 0.8%. The other parts are the same as those of the third embodiment.

Coating Material Example 9

The coating material of Example 9 differs from Example 3 only in that the average particle size of the Dy—Fe—Co—H alloy powder of Example 9 is 0.3 and the average particle size of Al powder is 2 μm.

Coating Material Example 10

The coating material in this embodiment is made of 93 wt % Tb—Fe—Co—H alloy powder and 7 wt % Zn powder.

The average particle size of the Tb—Fe—Co—H alloy powder was 1.5 and the average particle size of the Zn powder was 0.4 μm.

In the Tb—Fe—Co—H alloy powder, the Fe content is 4 wt %, the Co content is 3 wt %, and the H element content is 0.5%.

Preparation Method Examples 1-9

The coating materials of Examples 1 to 9 are added to the ethanol solution together with polyvinyl butyral to form a slurry, and the coating materials and the polyvinyl butyral of the slurry are respectively 65% by weight and 3% by weight.

Nine pieces of the sample number 38H neodymium-iron-boron magnets (size 50 mm*50 mm*3 mm) prepared through the steps of smelting, pulverizing, forming and sintering were respectively immersed in the slurry formed in the coating material. They were made sure that the surface was uniformly coated with slurry, and the coating amount of the slurry is 1 wt % of the NdFeB magnet substrate, then they were taken out from the slurry and dried. The coated NdFeB magnet substrate was then put into the sintering furnace, which was evacuated to 0.01 Pa. Next the magnet substrate was left in an argon atmosphere for the thermal diffusion treatment. The first-stage diffusion heat treatment was performed at 700° C. for 7 hours in the argon atmosphere, then the temperature was raised to 980° C., the second-stage diffusion heat treatment was performed for 13 hours. This thermal diffusion treatment was followed by a low temperature annealing at 500° C. for 5 hours. Finally, the NdFeB magnets 1-9 were obtained.

Production Method Example 10

The coating material of in Example 10 was added to the ethanol solution together with polyvinyl acetal to form a slurry. The percentages of the coating material and the polyvinyl acetal in the slurry were 60 wt % and 4 wt %.

Sample number N50 neodymium-iron-boron magnet substrate (size 50 mm*50 mm*3 mm) prepared through the steps of smelting, milling, forming, and sintering was put into the slurry formed in coating material of Example 10. The magnet was immersed and coated to make the surface coating uniform. The coating material amount in the slurry was 1.5 wt % of the NdFeB magnet substrate. The magnet was then taken out and let dry. The coated NdFeB magnet substrate was put into the sintering furnace, which was evacuated to vacuum pressure 0.01 Pa. Then the magnet was sent to an argon atmosphere. Next the first-stage diffusion heat treatment was performed to the magnet at 600° C. for 9 hours in the argon atmosphere. Then the temperature raised to 950° C., the second-stage diffusion heat treatment was performed to the magnet for 15 hours. The two stage thermal diffusion treatment was followed by annealing at a low temperature of 400° C. for 4 hours to obtain the neodymium iron boron magnet 10.

Production Method Example 11

The difference between Preparation Method Example 11 and Preparation Method Example 3 is only that the NdFeB substrate coated with the slurry was placed in a sintering furnace, evacuated to 0.01 Pa, and then sent into an argon atmosphere. The first-stage diffusion heat treatment was performed at 700° C. for 2 hours in an argon atmosphere, then the temperature was raised to 980° C., and the second-stage diffusion heat treatment was performed for 13 hours, followed by annealing at low temperature of 500° C. for 5 hours to obtain the neodymium-iron-boron magnet 11.

Production Method Example 12

The difference between Preparation Method Example 12 and Preparation Method Example 3 is only that the NdFeB magnet substrate coated with the slurry was placed in a sintering furnace, evacuated to 0.01 Pa, and then sent into an argon atmosphere. The first-stage diffusion heat treatment was performed at 700° C. for 7 hours in the argon atmosphere, and then the temperature was raised to 980° C., and the second-stage diffusion heat treatment was performed for 8 hours, followed by annealing at low temperature of 500° C. for 5 hours to obtain the neodymium-iron-boron magnet 12.

Comparative Preparation Method Example 1

The difference between the comparative preparation method Example 1 and the preparation method Example 3 is that the NdFeB magnet substrate coated with the slurry was placed in a sintering furnace, evacuated to 0.01 Pa, and then sent into an argon atmosphere. Diffusion heat treatment was performed at 980° C. for 13 hours in the argon atmosphere, followed by annealing at low temperature of 500° C. for 5 hours to obtain the neodymium-iron-boron magnet 13.

Comparative Preparation Method Example 2

The difference between the comparative preparation method Example 2 and the preparation method Example 3 is that the NdFeB magnet substrate coated with the slurry was placed in a sintering furnace, evacuated to 0.01 Pa, and then sent into an argon atmosphere. Diffusion heat treatment was performed at 980° C. for 16 hours in that argon atmosphere, followed by the annealing as low temperature of 500° C. for 5 hours to obtain the neodymium-iron-boron magnet 14.

Comparative Preparation Method Example 3

The difference between the comparative preparation method Example 3 and the preparation method Example 3 is that the NdFeB magnet substrate coated with the slurry was placed in a sintering furnace, evacuated to 0.01 Pa, and then sent into an argon atmosphere. Diffusion heat treatment was performed at 980° C. for 20 hours in that argon atmosphere, followed by annealing at a low temperature of 500° C. for 5 hours to obtain the neodymium iron boron magnet 15.

Magnet performance test data on the neodymium-iron-boron magnets 1-15 prepared as above are summarized and as shown in TABLE 1.

TABLE 1

| NdFeB magnet | Magnetic remanence (kGs) | Maximum magnetic energy capacity (MGOe) | Coercive force (kOe) |
|---|---|---|---|
| 38H NdFeB base | 12.41 | 37.3 | 17.4 |
| N50 NdFeB base | 14.11 | 48.2 | 13.5 |
| NdFeB magnet 1 | 12.20 | 36.5 | 24.8 |
| NdFeB magnet 2 | 12.40 | 37.1 | 27.0 |
| NdFeB magnet 3 | 12.43 | 37.4 | 28.5 |
| NdFeB magnet 4 | 12.41 | 37.2 | 27.4 |
| NdFeB magnet 5 | 12.37 | 36.9 | 26.2 |
| NdFeB magnet 6 | 12.22 | 36.3 | 24.2 |
| NdFeB magnet 7 | 12.28 | 36.5 | 25.3 |
| NdFeB magnet 8 | 12.37 | 36.8 | 25.1 |

TABLE 1-continued

| NdFeB magnet | Magnetic remanence (kGs) | Maximum magnetic energy capacity (MGOe) | Coercive force (kOe) |
|---|---|---|---|
| NdFeB magnet 9 | 12.38 | 37.0 | 26.4 |
| NdFeB magnet 10 | 14.12 | 48.1 | 22.1 |
| NdFeB magnet 11 | 12.28 | 36.7 | 25.4 |
| NdFeB magnet 12 | 12.21 | 36.5 | 25.0 |
| NdFeB magnet 13 | 12.13 | 36.1 | 23.6 |
| NdFeB magnet 14 | 12.15 | 36.3 | 23.9 |
| NdFeB magnet 15 | 12.11 | 36.0 | 23.8 |

The magnet performance data of NdFeB magnet 1 and NdFeB magnet 2 show that the presence of H element in Dy—Fe—H alloy powders improves the magnet performance to a certain extent. Analyzing the data of NdFeB magnets 2-4 shows that the combined use of Fe and Co is more conducive to the diffusion of Dy element, and ultimately improves the performance of the magnets. The weight ratio of Fe and Co elements controlled at (1-2): 1 gives better results relatively. The content proportion of the low melting point metal powder B in the coating material plays a great influence on the diffusion performance of the heavy rare earth elements through the grain boundaries. Comparing the performance data of the neodymium iron boron magnets 3 and 5-7, it can be seen that the content of Al powder either being too high or being too low is not conducive to Dy element diffusion, which shows a reduction in magnet performance, especially the coercive force of the magnets. Fe and Co in the neodymium-iron-boron magnet 8 account for 12 wt % of the Dy—Fe—Co—H alloy powder, and the coercive force is significantly reduced. The first-stage diffusion heat treatment time of the neodymium-iron-boron magnet 11 and the second-stage diffusion heat treatment time of the neodymium-iron-boron magnet 12 are shorter, the element penetration is incomplete, thus, the performance of the magnet 12 is significantly reduced. Nd—Fe—B magnets 13-15 are directly heat-treated at 980° C. Dy—Fe—Co—H alloy and Al powders diffuse into the magnets almost simultaneously. Dy's diffusion efficiency, diffusion depth, and diffusion uniformity have all reduced, showing as decrease in magnet performance.

Finally, it should be noted that the above embodiments are only used as examples for describing the technical solutions of the present disclosure, instead of limiting the technical solutions. Although the present disclosure is described in detail with reference to the above embodiments, it should be understood by one skilled in the art that the technical solutions recorded in the above embodiments may still be modified, or some or all of the technical features may be replaced equivalently. These modifications or replacements do not make the essence of the corresponding technical solution deviate from the scope of the technical solutions of the embodiments of the present disclosure.

What is claimed is:

1. A method for fabricating a magnet with a coating material, wherein the coating material comprises an alloy powder A having a rare earth element and a metal powder B, wherein the method comprises following steps:

providing a rare earth magnet;

providing a slurry comprising the coating material;

coating the slurry on a surface of the rare earth magnet;

performing a two-stage diffusion heat treatment on the coated rare earth magnet; and annealing the rare earth magnet;

wherein the rare earth magnet comprises a neodymium-iron-boron (NdFeB) magnet;

wherein a melting point of the metal powder B is lower than a melting point of the alloy powder A; and wherein the metal powder B in the coating material is arranged to be in a range of 3-10% by weight;

the rare earth element in the alloy powder A comprises Dysprosium (Dy) and/or Terbium (Tb) in a form of a rare earth-metal-hydrogen alloy (RMH) powder; metal M of the alloy powder A is an alloy composed of Fe and Co, and a mass ratio of the Fe and Co elements is 1:1 to 2:1;

an average particle size of the alloy powder A is in a range of 1 to 5 μm, and an average particle size of the metal powder B is in a range of 0.1 to 0.5 μm;

wherein performing the two-stage diffusion heat treatment comprises:

performing, in a first stage, diffusion at 600-800° C. for 5-15 hours; and performing, in a second stage, diffusion at 850-1000° C. for 10-20 hours.

2. The method according to claim 1, further comprising following steps:

melting an alloy ore of the alloy powder A, wherein the alloy ore is an ingot or a slab; and pulverating the alloy ore by performing a hydrogen crushing process followed by dehydrogenation to generating RMH alloy powder A; wherein the average particle size of the RMH alloy powder A is 1-2 μm.

3. The method for fabricating the rare earth magnet according to claim 1, wherein the coating material in the slurry is at 50-70% by weight; wherein the slurry further comprises:

a thermoplastic resin at 0-8% by weight; and an organic solvent for a balance weight.

4. The method according to claim 1, wherein the annealing is performed at 350-550° C. for 4-6 hours.

5. The method according to claim 1, wherein the metal powder B comprises one or more of zinc (Zn), aluminum (Al), and gallium (Ga).

6. The method according to claim 1, wherein the coating material comprises thermoplastic resin, and wherein the thermoplastic resin comprises one of polyvinyl butyral, polyvinyl acetal, and polyvinyl alcohol.

7. The method according to claim 6, wherein a content of the thermoplastic resin in the slurry is chosen at 2-5 wt %.

* * * * *